April 14, 1970  R. W. MacDONNELL  3,506,475
METHOD FOR MAKING PLEATED FILTER WITH STIFFENED PEAKS
Filed Aug. 16, 1968  3 Sheets-Sheet 3
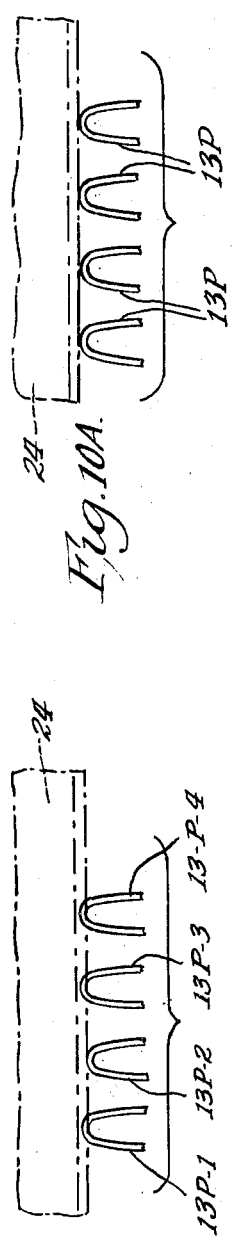
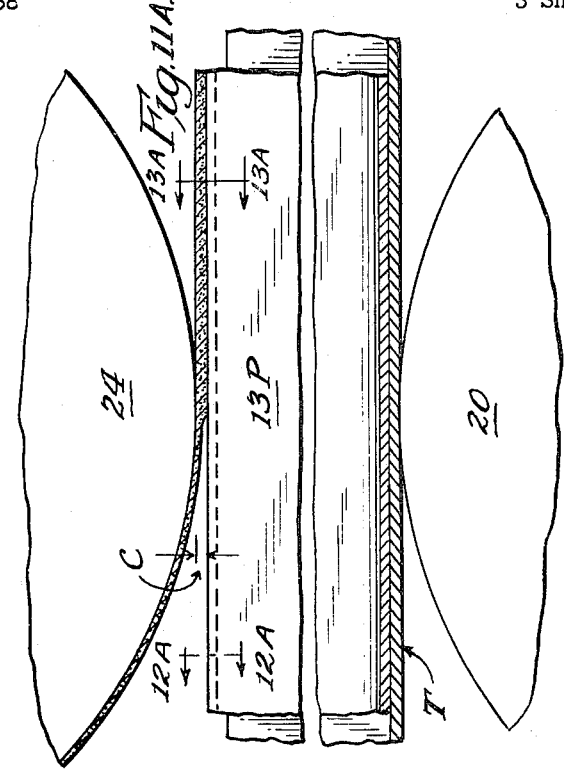
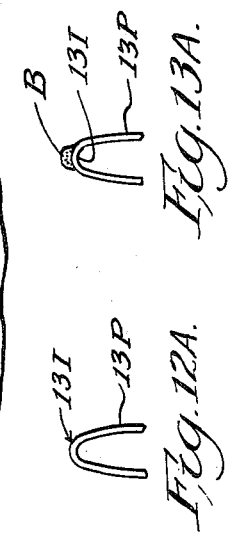
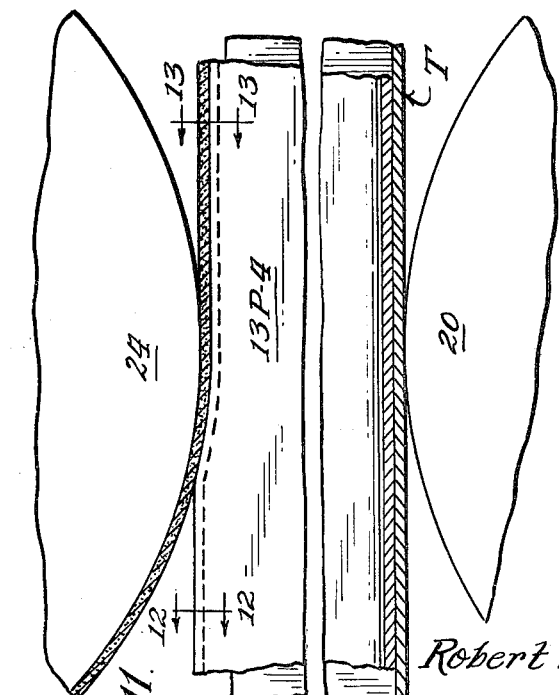
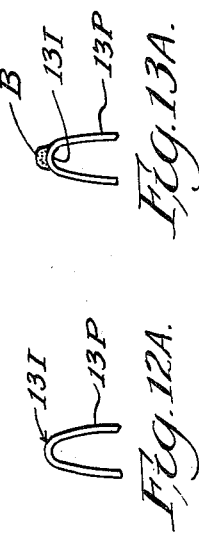
Inventor
Robert W. MacDonnell
By J. Patrick Cagney
Atty.

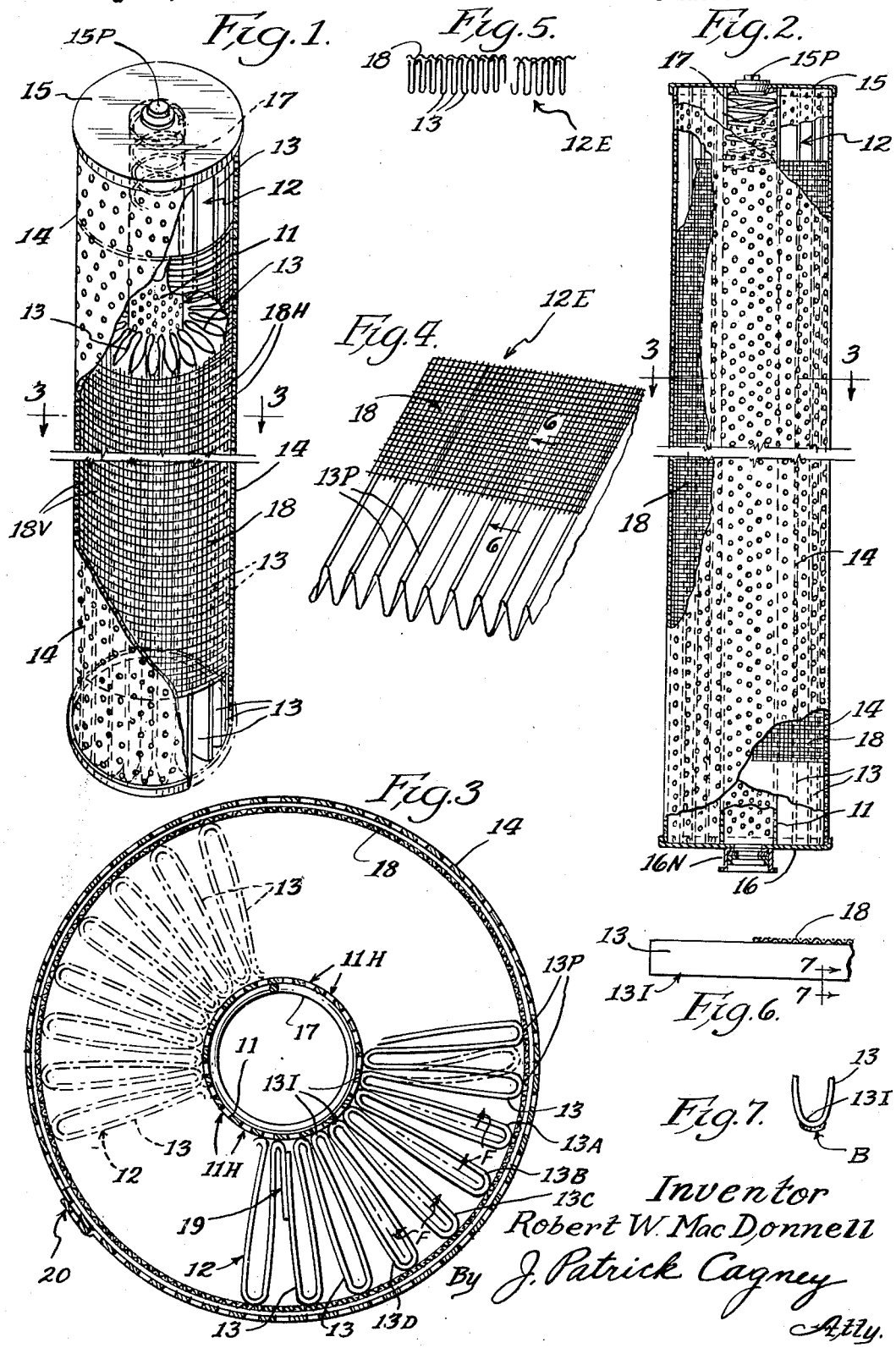

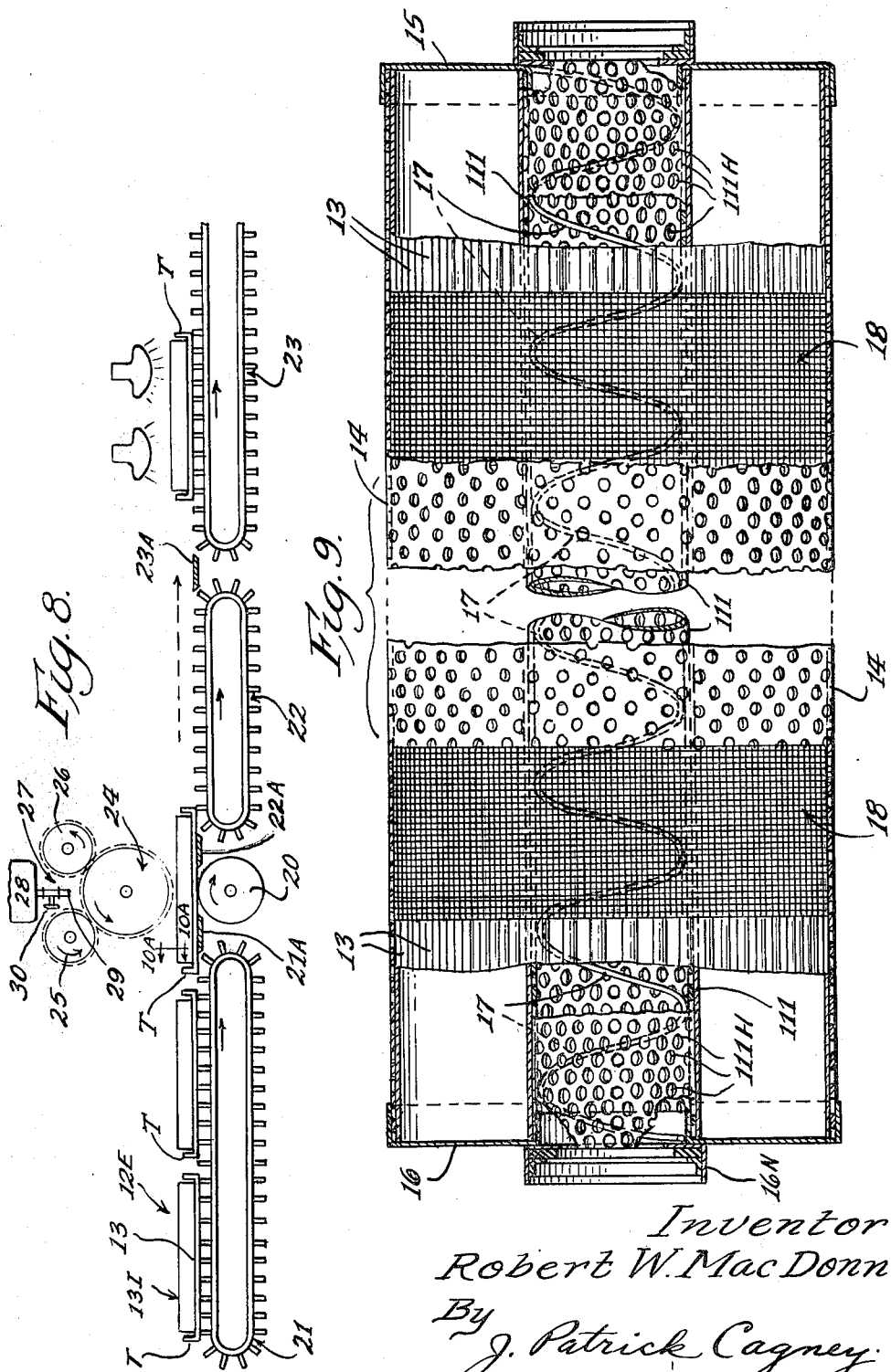

United States Patent Office 3,506,475
Patented Apr. 14, 1970

3,506,475
METHOD FOR MAKING PLEATED FILTER WITH STIFFENED PEAKS
Robert W. MacDonnell, Crete, Ill., assignor to Allied Filter Engineering, Inc., Chicago, Ill., a corporation of Illinois
Continuation-in-part of application Ser. No. 448,427, Apr. 15, 1965. This application Aug. 16, 1968, Ser. No. 753,300
Int. Cl. B01d 27/06; D21h 1/10, 5/00
U.S. Cl. 117—44        5 Claims

ABSTRACT OF THE DISCLOSURE

Method for depositing a reinforcement bead on a pleated filter sheet by conveying a pleated sheet in a direction along the pleats, rotating an applicator roll with adhesive film thereon above the pleats and transverse the pleats, the applicator roll being spaced from the tops of the pleats so that the adhesive film is in contact with all the pleat tops to deposit the adhesive simultaneously thereon.

---

This application is filed as a continuation-in-part of my co-pending application Ser. No. 448,427 filed Apr. 15, 1965, now Patent No. 3,397,793 and entitled "Pleated Filter," the disclosure of which, to the extent not inconsistent herewith, is specifically incorporated by reference.

BACKGROUND OF THE INVENTION

One important application for pleated paper type filters exists in the high pressure lubrication systems of locomotives. The locomotive applications exhibit very difficult operating conditions including high system pressures and flows, cold oil surges at startup, high normal running temperatures, wide variations in contaminant particle sizes and a tendency for filtered contaminants progressively to build up deposits leading to blocking of the pleat pores and final loss of permeability.

Filters for such applications should exhibit a maximum of flow-through capacity per unit volume; should maintain a maximum exposed effective filter area; should prevent permanent pleat collapse; and should be effective to filter a wide range of particle sizes including particularly sizes as small as 5 microns, or smaller.

Typically, the filter media now used in filters for high pressure lubrication systems is comprised of a phased paper (preferably 100% cotton fibers) which is impregnated with phenolic resin in the conventional fashion at the paper mill. In some instances, a lick coating, that is, a phenolic resin coating applied only on the downstream face, is employed to present an active cotton linter system that is effective in filtering the extremely small particle sizes. In other instances, the entire body of the filter media is saturated by phenolic resin impregnation thereof, to provide a fully saturated filter media.

In pleated paper filters for use in high pressure lubrication systems, where filters having an annular array of pleats are employed, it has been common practice to provide a perforated central core to abut the inner peaks of the pleats, the core having for example about 15% of the area of its cylindrical periphery open. Normally, the core is fitted with a stiff helical coil spring to reinforce the core against buckling without, however, introducing significant blockage of the wall apertures of the core. There is a limit imposed upon the number and the size of the wall apertures, as determined by the action of the oil flow pressure which tends to buckle inwardly or dimple the portions of the inner peaks that bridge the wall apertures. Such inward buckling or dimpling is encountered both with the "lick coated" filter media and with the "fully saturated" filter media and it is highly objectionable as it causes positive blockage of each core aperture where this occurs. This relationship has heretofore dictated the permissible aperture size and spacing. In fact, the limited flow areas through the core represent one of the major factors in determining the overall flow resistance and, hence, have a major effect upon the total pressure drop across the filter.

Where water is present in the oil of the lubrication system, the "lick coated" filter media is particularly vulnerable as the water permeates and deteriorates the paper media, particularly at the bridging regions of the inner peaks where the flow is most concentrated. The water presence greatly aggravates the dimpling problem and leads to excessive pressure drops across the filter long before the filtering characteristics of the filter media have been used up. It has been shown that a severe dimpling problem arises in a system where 2 quarts of water were present in 35 gallons of oil.

To date, for the solution, it has been proposed to increase the phenolic content of the resin impregnation from about 7% to about 14% and to increase the resin penetration from 10% to 30%. This inhibits dimpling occasioned by water induced deterioration but the original restrictions on core apertures and consequently on flow rates and pressure drops through the filter are not improved because the problem of buckling or dimpling due to inadequate media strength still remains.

SUMMARY OF THE INVENTION

This invention is concerned with manufacturing methods utilizing a pleated form of fibrous sheet material type of filter media. In general the filter media is a phased paper and may be any combination of cotton, synthetic or wood fibers or all of one kind. The invention is applicable to lubrication oil filters, fuel oil filters and industrial filters such as are used for water, paint, chemicals, vinegar, corn syrup and the like.

In accordance with this invention, an improved mounting arrangement for a pleated type of filter media is provided which makes possible a lower effective flow resistance and hence a smaller filter pressure drop.

In the improved arrangement, a separate adhered reinforcement bead is disposed substantially only along each of the downstream peaks of the filter pleats to lie in abutting relation to a downstream reinforcement structure for stabilizing the pleat array of the filter media in the presence of the pressure drop thereacross. In the disclosed arrangement a perforate central core is encircled by an annular array of pleats wherein a radially inward flow of oil loads the inner peaks each having an adhered reinforcement bead stiffening the same against dimpling at the regions that bridge the wall openings in the core and serving to resist deterioration of the material of the filter media at the regions most subject to such attack.

In accordance with the method of this invention for the manufacture of a pleated filter, the improvement comprises pleating a flat sheet of fibrous filter material to form a filter element having a set of pleats disposed to present a flat array of inner peaks, depositing a separate adhered reinforcement bead substantially only along each of the inner peaks, and mounting the filter element with its inner peaks adjacent and facing a downstream reinforcement structure having openings for through-flow of fluid after filtering flow through the filter element. More particularly, the depositing step is performed by maintaining a flowable adhesive film upon an applicator roll, rotating the roll to wet each of the inner peaks with adhesive, and curing the adhesive on the inner peaks to form the reinforcement beads.

Where the inner peaks, as pleated, are of slightly different height, the applicator roll is rotated in contacting slightly compressing relation to the higher peaks to enable wetting of all of the inner peaks. Several passes may be required to build up a thick bead and the bead extends slightly around the sides of the peaks. Where the inner peaks, as pleated, are of uniform height, the applicator roll is rotated in close clearance capillary relation to deposit a bead along only the extreme apex line of each inner peak. With this approach a single pass provides a relatively thick bead and substantially no coverage of the sides of the peaks.

Other features and advantages of the invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of the specification, and in which numerals are employed to designate like parts through the same, FIG. 1 is a perspective view of a completed single section filter of a type used in the engine lubrication system of a locomotive, with various portions of the filter broken out and sectioned to facilitate disclosure;

FIG. 2 is a side elevational view of the completed filter, again with portions broken out and sectioned to facilitate disclosure;

FIG. 3 is an enlarged transverse sectional view taken as indicated by the lines 3—3 shown in each of FIGS. 1 and 2;

FIG. 4 is a fragmentary perspective view illustrating an artificial pleat spacing technique utilized during manufacture to enable application of the netting to the pleats with proper predetermined peak to peak pleat spacing corresponding to the natural spacing assumed by the pleats when disposed in an annular array in the completed filter;

FIG. 5 is a fragmentary and elevational view illustrating a further manufacturing procedure wherein the pleated filter element and the netting are compressed in stacked relation to restore all of the pleats to their natural size and shape prior to rolling into an annular array;

FIG. 6 is a fragmentary side sectional view through the pleated filter element and is taken on the line 6—6 of FIG. 4;

FIG. 7 is greatly enlarged transverse sectional view taken as indicated on the line 7—7 of FIG. 6 and showing a reinforcement which is provided along the inner peaks of the pleats to overcome the dimpling tendency of such region;

FIG. 8 is an enlarged broken away sectional view of an improved filter structure utilizing a more open core to minimize flow resistance and filter pressure drop;

FIG. 9 is a diagrammatic side elevational view of a filter process line utilized in the practice of this invention;

FIG. 10 is an enlarged transverse sectional view taken as indicated on the line 10—10 of FIG. 9 and showing the configuration of the inner peaks of a pleated filter media of the type having pleats of slightly different height.

FIG. 10A is a view similar to that of FIG. 10, but showing the inner peaks of a pleated filter media of a type having all pleats of equal height;

FIG. 11 is an enlarged fragmentary side view of an adhesive applicator station in the process line of FIG. 9 and intended particularly for use with the pleats of different height of FIG. 10;

FIG. 11A is a view similar to that of FIG. 11, but showing the arrangement utilized with pleats of equal height;

FIGS. 12 and 13 are enlarged fragmentary transverse sectional views of the inner peak of a typical high pleat the same before and after the provision of a reinforcement bead; and FIGS. 12A and 13A are corresponding views of an inner peak of an equal height media of FIG. 10A and showing the same before and after the provision of a reinforcement bead.

Referring now to the drawings, the invention as disclosed herein is illustrated in connection with cylindrical type filters suited particularly for use in the engine lubrication systems of diesel locomotives. In the various drawing figures, a single cylindrical section type of filter is illustrated but it should be understood that the invention has application to other filter embodiments that utilize pleated filter media of a fibrous sheet material type.

The single section filter of FIGS. 1 to 3, as shown herein for purposes of illustrative disclosure, includes a perforated cylindrical tube 11 serving as a core, an elongated permeable filter section 12 disposed in an annular array closely encircling the core and characterized by a series of circumferentially distributed pleats 13 which extend lengthwise substantially coextensive with the core. The filter section 12 when arrayed annularly presents a radially inner set of peaks 13I and a radially outer set of peaks 13P. An outer cover wrap 14 closely encircles the filter section 12 and may extend the full length thereof to seat in upper and lower end caps 15 and 16, respectively, which are usually bonded in closure relation across opposite ends of the filter section. Each of the end caps also has sealing relationship to the opposite ends of the core 11 to prevent end leakage of unfiltered oil into the core. The upper end cap 15 has a central access plug 15P normally closing the same while the lower end cap 16 is fitted with a central connection nipple 16N completing a discharge outlet passage from the lower end of the core 11.

The core 11 is preferably constructed of light gauge sheet metal and is provided with internal reinforcement in the form of a helical spring 17 extending substantially its entire length and serving to prevent buckling of the core under high system pressures and surges. The metal core construction is resistant to deterioration even in the presence of high temperature oil. While the core 11 is illustrated as a permanent part of the completed filter, this is not a necessary requirement for filter constructions incorporating the principles of the present invention.

The outer cover wrap 14 may be of a perforated paper, paperboard, or thin sheet metal construction when used full length of the filter or may be imperforate when extending only part way of the length of the filter.

In the filter embodiment shown herein, the adjacent pleats 13 are connected in a mechanically ganged relationship so that circumferential flexing of any one pleat involves circumferential flexing of a plurality of successively adjacent pleats. Such a mechanically ganged arrangement is best accomplished by connecting the pleats with a flexible tension transmitting structure. Structures for this purpose are most easily connected to the pleats by securement in overlying multiple point contact to each of the outer peaks of the pleats.

One tension transmitting structure for ganging the pleats is represented in FIGS. 1 to 5 as comprising a netting 18 of flexible strand material and extending in encircling relaxed relation about the outer peaks 13P of the pleats. It is apparent in the drawings that the netting has multiple point intersecting contact for multiple point securement to each of these outer peaks 13P. The netting 18 is represented as a reticulated network of generally horizontal strands 18H and generally vertical strands 18V. The horizontal strands 18H preferably extend substantially circularly of the pleat circumference for optimum control of circumferential flexure but some angling can be utilized in order to increase the points of intersection between the vertical strands 18V and the outer peaks. In the arrangement illustrated, the netting has a vertical dimension corresponding to about 75% of the length or height of the filter element. For example, for a 30 inch long filter element, the netting may be 22 inches long and centered with respect to the ends of the filter.

The manufacture of the filter section starts with a flat sheet of filter media which is usually impregnated at the mill with a resinous material such as a thermosetting phenolic condensation product and delivered in rolls. The sheet material is pleated in any desired manner to present a planar array of pleats, each inherently being resiliently flexible. This planar array is cut to proper length to provide the desired size filter element 12E as shown fragmentally in FIGS. 4 and 5. In current practice for diesel engine lubrication filters it is preferred to utilize a filter media of 100% cotton linters provided only with a "lick coated" impregnation upon its downstream face. As will become clear, however, the invention also finds important application with fully saturated filter media and with filter media of other fibrous materials such as wood or synthetics. The final treated filter media typically may have a pore size in the range of from about 10 microns to about 25 microns.

The precut element 12E of the pleated filter media is placed in a handling jig that artificially establishes a substantially flat formation as pictured in FIG. 4 wherein corresponding outer peaks 13P of the pleats have a peak to peak spacing which is substantially the equivalent of the natural peak to peak spacing assumed by the pleated filter element when rolled from the planar array in which it is formed to an annular array encircling the core 11.

With the outer peaks of the pleats properly spaced as illustrated in FIG. 4, adhesive is appropriately applied along the lengths of the outer peaks. Preferably strip coatings of thermosetting adhesive are applied by means of a roller or other applicator to the pleat peaks along the regions to be provided with the netting. A netting 18 of precut size is laid over the outer peaks, with the netting being in a snug but relaxed configuration so that the strands of the netting are neither tensioned nor unduly slack. Where thermosetting adhesive is used on the peaks, the handling jig with the netting in place on the pleat peaks, is located beneath a heated plate that contacts the netting and pleat peaks with slight pressure, only sufficient to assure total bonding of the netting to the peaks.

While the filter media as originally pleated preferably may have the pleats which are to be secured to the netting of corresponding height the conformability of the flexible netting and the action of the handling jig in which the peaks are artificially spaced avoid any difficulties that might arise where the pleats are of somewhat different height. Moreover, it should be noted that where the netting is inelastic, which is preferred, the exactness of the artificial spacing is important for insuring that the completed filter section 12 may be rolled into an annular array characterized by substantially uniform peak to peak spacing about its entire circumference.

In the filter embodiment shown in FIGS. 1 to 7, the core 11 has its holes 11H disposed in a staggered pattern with web spacings of one-quarter inch between adjacent holes and with the holes being of 3/32" diameter such that the total cumulative open area defined by all of the holes 11H is about 13% of the cylindrical surface area of the core 11. This relatively sparse hole configuration has been required in the core for minimizing the tendency of the inner peaks 13I of the pleats to dimple at the regions which bridge across the core holes. It may be seen that such dimpling causes the inner peak to expand across the width of each hole so as to produce substantial blockage.

In the present disclosure, each of the inner peaks 13I is provided with a separate adhered reinforcement bead B which is shown disposed substantially only along each of the downstream faces of the inner peaks as is best seen in FIG. 7. The reinforcement bead B on each inner peak 13I markedly strengthens the bead against dimpling at the regions that bridge the core holes and thereby preserves the desired open area through the core so that the pressure drop across the filter is not unduly increased in the absence of the filter itself becoming clogged by the solids which are to be filtered and trapped.

Another important advantage arising from the use of a stiffening bead on each inner peak 13I is that it protects the precise region along the inner peaks where the inward radial flow of oil passes through the core holes. This is the region most subject to physical deterioration, for example with a fibrous paper media any water present in the oil being filtered attacks the fibrous structure. The effect is most pronounced at the inner peak region and causes a deterioration and loss of strength of the pleat walls so that dimpling in such cases occurs not only because of the flow pressure but because of the weakened wall.

Another embodiment of the invention is illustrated in FIG. 9 wherein similar reference characters are utilized for all parts other than the core which is the only structure that distinguishes the embodiments of FIGS. 1 to 7 and FIG. 9. It has been found that where a reinforcement bead B having a height of 1/32" in the case of a diesel engine lubrication oil filter is provided along each of the inner peaks, the pleat wall structure requires less downstream reinforcement. Thus, the core 111 in the embodiment of FIG. 9 has a significantly different pattern of hole spacing and hole size. In particular, the core 111 in the embodiment of FIG. 9 has holes 113H of 1/4" diameter and spaced closely together so that the intervening web portions are about 1/16" in width and the cumulative area of the core holes in this form is 60% of the total surface area of the core. The filter structure as disclosed in FIG. 9 with the larger core holes and closer spacing in combination with the reinforcement beads B on the inner peaks 13I, as compared with the conventional filter having no bead and having the wider hole spacing and smaller hole diameter, allows a 50% greater flow rate while also being less subject to dimpling of the inner peaks and to deterioration of the pleat walls. The result is that the total pressure drop across the filter is substantially reduced and the overall useful life of the filter is now determined primarily by the filling of the filter media rather than permitting dimpling to cause excessive pressure drops across the filter.

An arrangement for providing the reinforcement bead B is illustrated in FIG. 8 wherein a power driven feed roll 20 is shown located intermediate of a power driven slat-type in-feed conveyor 21 and a power driven slat-type transfer conveyor 22. A power driven slat-type output conveyor 23 is shown leading beneath a battery of heat lamps L. Transfer plates 21A, 22A and 23A are shown bridging the end gaps between the conveying mechanisms to define a process line for conveying flat trays T along a straight line path. Each of the trays T is shown provided with a filter element 12E disposed in a flat planar array with its inner peaks 13I uppermost and oriented lengthwise in the direction of travel of the trays T. These filter elements 12E have already been provided with netting 18 on their outer peaks 13P, the netting lying in the base of the trays T and not being visible in the reduced scale of FIG. 8.

The feed roll 20 is power driven in synchronism with the conveyors 21, 22 and 23 and it is in underlying vertical alignment with a stainless steel applicator roll 24 that is positioned a precise distance above the feed roll 20 as determined by the elevation of the inner peaks 13I passing between these rolls. A pair of power driven doctor rolls 25, 26 are symmetrically positioned above the applicator roll 24 to define a sump or well region 27 where a pool of adhesive is maintained as supplied from an adhesive tank 28 through a feed nozzle 29 and control valve 30. The rotation of the rolls 24, 25 and 26 is as indicated in FIG. 8 so that adhesive is fed along a path leading counterclockwise around the exterior of doctor roll 25 and then leading counterclockwise around applicator roll 24 and then leading counterclockwise around doctor roll 26. Thus adhesive is carried as a distributed film on the roll 24 and is continuously and progressively applied in the form of a bead upon the inner peaks of the pleated filter element which is then conveyed through a curing station where the heat lamps L accelerate the cure of the adhesive. In the particular embodiment illustrated herein an adhesive of a thermosetting water based fortified vinyl resin emulsion type is employed but any other adhesive able to resist high temperature and chemical attack is also contemplated. At present a non-plasticized adhesive is preferred, however, a plastisol, if sufficiently viscous and if capable of being handled through the applicator system, could also be used.

In current practice there are two different types of machines in use for pleating of paper filter media. A Chandler pleater is commonly employed in which case the various pleats in each filter section 12E are of slightly varying height as is illustrated for the pleats in FIG. 10 which are shown associated with an applicator roll in a fashion so that pleats 13P-1, 13P-2 and 13P-3 are contacted by the adhesive film but not by the surface of the applicator roll, whereas pleat 13P-4 is actually contacted by and compressed by the roll 24. The difference in the pleat heights for a filter element produced on a Chandler pleater may be as much as $1/16''$.

Gear type pleaters, however, are available and are capable of providing pleats as shown in FIG. 10A all of uniform height. A pleated filter media having uniform height pleats is processed through the line of FIG. 8 in a fashion so that the inner peaks 13I maintain a fixed clearance distance with respect to the surface of the applicator roll 24. Typically this distance may be about $1/32''$ in which case the thickness of the adhesive film on the roll 24 will also be about $1/32''$.

The action of the applicator roll in relation to filter sections wherein the pleats are of unequal height is illustrated in the enlarged view of FIG. 11, where the tall pleat 13P-4 is shown being compressed by the applicator roll 24 sufficiently to insure that adhesive will deposit on all of the pleats. With this technique there is a squeegee-like wetting of the tall pleats and of most of the intermediate pleats with the result that the applied bead B is of reduced thickness and is of greater width. Thus FIG. 12 shows the pleat 13P-4 before application of adhesive and FIG. 13 shows the pleat 13P-4 after application of adhesive wherein it is apparent the pleat walls have been outwardly bowed and the apex line has been flattened and the bead B extends around the sides of the inner peak 13I a substantial distance from the apex line. With this approach several passes of the filter element beneath the roll are utilized to build up a sufficiently thick bead and the lateral extension of the bead blocks off more of the filter wall surface area than is actually required for preventing dimpling.

The application of adhesive in the case of the uniform height pleats of FIG. 10A is illustrated in FIG. 11A wherein the applicator roll 24 is shown being rotated in close clearance capillary relation to the apex line of the pleats to deposit a bead of adhesive having a thickness determined by the clearance C between the surface of the roll 24 and the apex line. With this approach a single pass utilizing a clearance of $1/32''$ will provide a bead of $1/32''$ height. The typical uniform height pleat 13P is shown in FIG. 12A before adhesive is applied and in FIG. 13A after adhesive is applied the bead having a greater thickness and less lateral dimension than the bead under the compression technique which is shown in FIG. 11. It will also be noted that the pleat walls retain their originally pleated contour in the case of the uniform pleat of FIG. 13A. It may also be noted in the case of the technique shown in FIGS. 10A, 11A, 12A and 13A that the film of the flowable adhesive is preferably very slightly less thick than the clearance distance C as there is a reservoir of adhesive available from the regions of the roll intermediate of the pleat apex lines for producing the desired bead height. This assures a better control of the lateral extent of the bead.

After complete curing of the adhesive on the pleats the filter section assembly 12 comprised of the pleated paper filter element 12E and the netting 18 is lightly compressed into the stacked configuration illustrated in FIG. 5. This restores the pleats 13 to the natural configuration in which they are originally formed even in the event that this configuration were in any way distorted in connection with its insertion and processing in the handling jig. Thus it should be noted that the configuration of the pleats as illustrated in FIGS. 3, 13 and 13A is essentially the natural configuration assumed by the originally pleated filter media if it were to be rolled into an annular array.

In particular, this natural unstressed configuration is characterized by a slight bowing of the walls of each pleat and by the pronounced tendency for each pleat to undergo inherent resilient flexing movement about lenghtwise lines. The natural bowing effect is desirable for enabling each pleat to maintain effective filtering surface areas, thus intraface contact of the walls of each pleat is undesirable.

After the filter section is arrayed about the core, its opposite edges are overlapped as indicated at 19 in FIG. 3 and secured by staples or other suitable edge fastening means (not shown) to stabilize the configuration. The outer cover wrap 14 is then applied by wrapping a sheet about the unit, overlapping its opposite edges as indicated at 20 in FIG. 3 and securing the same in a side seam sealer. The outer cover wrap 14 encircles the pleats without interfering with the desired free flexure thereof.

The inherent resilient flexing action of each pleat is illustrated in phantom lines in the case of one of the pleats shown in FIG. 3. It will be appreciated that the relaxed but substantially slack free mounting configuration of the netting would cause a series of successively adjacent pleats, designated 13A, 13B, 13C and 13D in FIG. 3, to undergo corresponding circumferential flexing movement. This follower movement is not illustrated in the drawings except by showing pleat center lines in phantom and indicating by arrows F of proportional length the amount of flexure of each center line. It may be noted that the more remote a pleat is from the particular collapsing pleat, the less its flexure travel. This results from the cumulative effect of the slight slack action which normally exists in the circumferential strands 18H of the netting.

In the past, the problem has been in the case of pleated filter constructions that collapse of individual pleats by circumferentially flexing movement to a position where it contacts and blocks the filter surface of the next adjacent pleat leads to serious loss in the filter capacity. Previous approaches have been directed at stabilizing the position of the pleats whereas in the present arrangement, the tendency to flex is freely permitted and is utilized to achieve improved filter performance. Normally a pleat collapse will occur due to a cold oil surge on engine startup or due to a sharp variation in system operating pressures. Each of these are momentary conditions and the problem to solve has not been that of momentary pleat collapse. In the past, the collected deposits on the pleat faces cause a collapsed pleat to stick or cake on the next adjacent pleat so that the collapse becomes permanent.

The mechanically ganged action of the pleats in the present filter enables the successively adjacent pleats 13A, B, C and D to undergo individual follower flexing movement to store energy which is then collectively applied through the netting 18 to effect positive return movement of the collapsed pleat in spite of any tendency to stick. Moreover, each time a pleat flexes, any deposit building up on that pleat tends to fracture and drop off so that the flexing action continually tends to maintain the filter surfaces at their desired original permeability. Such deposits are forced to the lower end of the filter by the pattern of flow of the oil entering the filter through its outer cover wrap 14. The oil flow pattern has a natural vertical component due to the mounting arrangement of the filter and due to the location of its discharge outlet 16N.

Other advantages directly resulting from the use of netting as the means for mechanically ganging the pleats include the feature that the netting may have a large sized open mesh configuration to insure full flow action through the filter. The netting material may be selected to achieve superior bond relationship between the netting and the pleats, thereby enabling a filter that is otherwise largely conventional to be used in a system wherein the by-pass pressure valve opening is set at 125 p.s.i. rather than at 60 p.s.i. which has been the past practice. This increased by-pass valve setting means in the case of engine lubrication systems for locomotives that all of the lubrication oil can be passed through the filter so that the engine need never be exposed to unfiltered oil.

In the preferred practice of the invention, the netting 18 is preferably of a woven cotton fiber material. Desirably, this is inelastic, inexpensive, easy to bond to the pleated paper filter element, and capable of itself serving as a filtering media in the case of the more minuscle particles of contaminant. That is, particles of less than the pore size selected for the paper filter element itself. Thus in the case of an open mesh cotton netting, a maximum flow of oil is accomplished through the mesh openings and at the same time the fibrous texture of the cotton strands catch and trap the small particles carried in the oil passing through the strands.

A standard diesel lube oil filter is 6½ inches long in diameter and may have about 60 pleats.

Thus, while preferred constructional features of the invention are embodied in the structure illustrated herein, it is to be understood that changes and variations may be made by those skilled in the art without departing from the spirit and scope of the appended claims.

The embodiments of the invention in which an exclusive privilege or property is claimed are defined as follows:

1. In a method of depositing a separate adhered reinforcement bead substantially only along each corresponding peak of a pleated filter sheet of fibrous filter material, the improvement comprising providing a section of said sheet having a set of uniform height pleats presenting a set of corresponding peaks, conveying the section along a straight line path in the lengthwise direction of the pleats to advance the set of corresponding peaks in a common horizontal plane, rotating an applicator roll positioned transverse to the length of the set of pleats with its surface in adjacent offset relation to said plane to define a predetermined clearance gap between such surface and each of the peaks, maintaining on such surface a flowable adhesive film of sufficient thickness to span the gap and deposit adhesive along the length of each peak simultaneously to a height determined by the gap and curing the adhesive on the peaks to form the reinforcement beads.

2. In a method in accordance with claim 1 wherein said clearance gap is at least $\frac{1}{32}''$.

3. In a method in accordance with claim 1 wherein said adhesive comprises a thermosetting, water-based, fortified vinyl resin emulsion and the curing step comprises heating the adhesive until cured.

4. In a method in accordance with claim 1 wherein said peaks are directed upwardly and said roll is located above said peaks.

5. In a method in accordance with claim 1 and including rotating a feed roll horizontally beneath said applicator roll to support said filter section with said peaks in precise clearance relation to the surface of the applicator roll during passage of said filter section beneath said applicator roll.

References Cited

UNITED STATES PATENTS

| | | | |
|---|---|---|---|
| 2,663,660 | 12/1953 | Layte | 210—493 X |
| 2,749,265 | 6/1956 | Fricke et al. | 210—493 X |
| 2,772,181 | 11/1956 | Rogers et al. | 117—37 X |
| 2,785,081 | 3/1957 | Babiarz et al. | 117—37 X |
| 2,919,807 | 1/1960 | Briggs | 210—493 X |
| 3,025,963 | 3/1962 | Bauer | 156—278 X |
| 3,106,528 | 10/1963 | Burks | 210—493 X |
| 3,116,245 | 12/1963 | McNabb et al. | 210—493 X |
| 3,216,578 | 11/1965 | Wright et al. | 210—493 X |
| 3,306,794 | 2/1967 | Humbert | 210—493 X |
| 3,383,234 | 5/1968 | Nikkel | 117—37 |
| 3,174,625 | 3/1965 | Briggs | 210—493 |

FOREIGN PATENTS 1,361,119  4/1964  France.

REUBEN FRIEDMAN, Primary Examiner

C. M. DITLOW, Assistant Examiner

U.S. Cl. X.R.

117—111; 210—457, 493